US008760835B2

(12) United States Patent
Ozaki et al.

(10) Patent No.: US 8,760,835 B2
(45) Date of Patent: Jun. 24, 2014

(54) ARRESTER

(71) Applicants: Akihide Ozaki, Tokyo (JP); Hiroki Saito, Tokyo (JP); Koichi Akaso, Tokyo (JP)

(72) Inventors: Akihide Ozaki, Tokyo (JP); Hiroki Saito, Tokyo (JP); Koichi Akaso, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 43 days.

(21) Appl. No.: 13/671,187

(22) Filed: Nov. 7, 2012

(65) Prior Publication Data

US 2013/0308242 A1 Nov. 21, 2013

(30) Foreign Application Priority Data

May 16, 2012 (JP) ................................ 2012-112874

(51) Int. Cl.
*H02H 1/00* (2006.01)

(52) U.S. Cl.
USPC .......................................... 361/117; 361/127

(58) Field of Classification Search
USPC .......................................... 361/117–120, 127
See application file for complete search history.

(56) References Cited

U.S. PATENT DOCUMENTS 8,059,379 B2 * 11/2011 Saito et al. .................... 361/117
2008/0088406 A1 * 4/2008 Klaube et al. .................. 338/21

FOREIGN PATENT DOCUMENTS

JP 2002-075709 A 3/2002

* cited by examiner

*Primary Examiner* — Danny Nguyen
(74) *Attorney, Agent, or Firm* — Buchanan Ingersoll & Rooney PC

(57) ABSTRACT

To include a serial member, a pair of first electrodes sandwiching the serial member, a pair of second electrodes arranged on both outer sides of the first electrodes in a stacking direction, a plurality of insulating clamp members, and a wedge-shaped member tapered in the stacking direction. An annular member that presses the wedge-shaped member is provided on an axial-direction inner end surface of an outer circumferential edge of the second electrode, and the wedge-shaped member is pressed by the annular member by a leading edge portion of a bolt inserted from an axial-direction inner end surface of the annular member being tightened in the second electrode, thereby pressing an axial-direction outer surface of the insulating clamp member.

4 Claims, 5 Drawing Sheets

ARRESTER

BACKGROUND OF THE INVENTION

1. Field of the Invention

The present invention relates to an arrester.

2. Description of the Related Art

In a conventional type of polymer arrester in which an internal element including a zinc oxide element is directly molded with silicon rubber, for example, a plurality of zinc oxide elements are provided in an FRP (Fiber Reinforced Plastics) pipe in a stacked manner, electrodes are provided on top and bottom of the zinc oxide elements, a pressing spring for supporting the zinc oxide elements is provided between one of the electrodes and the zinc oxide elements, and an outer circumferential surface of the FRP pipe is covered by an outer polymer coat. The conventional arrester configured in the above manner achieves a mechanical strength with an insulating support member such as FRP arranged around the zinc oxide elements. Generally, the FRP in which a glass fiber is extended in one direction has an excellent mechanical strength against a tensile load exerting on a glass fiber direction, but not against a load in a direction perpendicular to the glass fiber direction. For this reason, when an electrode is fixed with FRP in which a hole processed portion is provided, for example, if a bending load is applied to the arrester, the load is concentrated on the hole processed portion, possibly resulting in breakage beginning at the hole processed portion so that a high mechanical strength cannot be expected. Therefore, a method of fixing the FRP and the electrode and the glass fiber direction of the FRP are important factors to obtain a high mechanical strength in the polymer arrester.

In a conventional polymer arrester disclosed in Japanese Patent Application Laid-Open No. 2002-75709, zinc oxide elements are stacked between a pair of electrodes, and a plurality of transverse U-shaped FRP clamp members are provided at a regular interval in a circumferential direction to nip a large diameter portion of each of the electrodes. The FRP clamp member includes no processed portion described above, and an FRP spiral member for preventing the FRP clamp member from being disengaged is provided on an outer circumference of the FRP clamp member.

However, because the FRP spiral member is provided to bundle the FRP clamp members in the conventional arrester disclosed in Japanese Patent Application Laid-Open No. 2002-75709, there may be a gap between an inner surface of the FRP spiral member and the outer surfaces of the FRP clamp members, by which the FRP clamp members and the electrode are not solidly fixed. The rigidity against the bending load at this time is lower than a case where the FRP clamp members and the electrode are solidly fixed. In such a structure of the conventional arrester, measures to achieve an arrester having a sufficiently high mechanical strength may include increasing the number of the FRP clamp members, increasing a cross-sectional area of the FRP clamp member, or increasing the rigidity of the arrester by winding the FRP spiral member in a tighter manner. However, such measures not only cause a size increase of the arrester and a complicated structure but also lead to an increase in cost of the arrester.

Meanwhile, because the conventional arrester employs the FRP spiral member, the thickness of an outer coat of the arrester in a radial direction increases, causing a size increase of the arrester and a complicated structure as described above. At the same time, as a usage amount of the silicon rubber increases, the size and the cost of the arrester increase accordingly. In a molded-type polymer arrester, when a short-circuit current flows, the silicon rubber is cracked by an arc gas generated in the arrester so that the arc gas is discharged from a side surface of the arrester. However, if the thickness of the silicon rubber is increased in the radial direction, the silicon rubber becomes hardly cracked, possibly failing to meet a predetermined pressure discharge performance.

The present invention has been achieved in view of the above problems, and an object of the present invention is to obtain an arrester having a high mechanical strength without causing any size increase.

SUMMARY OF THE INVENTION

There is provided an arrester comprising: a serial member including voltage nonlinear resistive elements and a pressing spring, the voltage nonlinear resistive elements being stacked, the pressing spring being arranged on one end of the stacked voltage nonlinear resistive elements, the pressing spring biasing the voltage nonlinear resistive elements in a stacking direction thereof; a pair of first electrodes arranged on both ends of the serial member to sandwich the serial member in the stacking direction; a pair of second electrodes each having a circular disk shape and respectively arranged on outer sides of the first electrodes in the stacking direction respectively facing the first electrodes; a plurality of insulating clamp members extending in the stacking direction and arranged around the serial member, each of the insulating clamp members including a bent portion on each end portion of the insulating clamp member, the bent portion being bent toward an axial line of the first electrodes at a position close to where the first electrode and second electrode facing each other; a wedge-shaped member arranged on a radial-direction outer surface side of each of the insulating clamp members and tapered in the stacking direction, wherein each of the second electrodes includes an outer circumferential edge surrounding an outer surface of each of the insulating clamp members, the arrester further comprises: an annular member that is arranged on a stacking-direction inner end surface of the outer circumferential edge and is configured to bias the wedge-shaped member; and a fastening member that is inserted from a stacking-direction inner end surface of the annular member and is configured to fasten the annular member and the second electrode, and wherein the wedge-shaped member is pressed against the second electrode by the annular member, thereby pressing the radial-direction outer surface of the insulating clamp member.

DETAILED DESCRIPTION OF THE PREFERRED EMBODIMENTS

Exemplary embodiments of an arrester according to the present invention will be explained below in detail with reference to the accompanying drawings. The present invention is not limited to the embodiments.

First Embodiment

Figure 1:
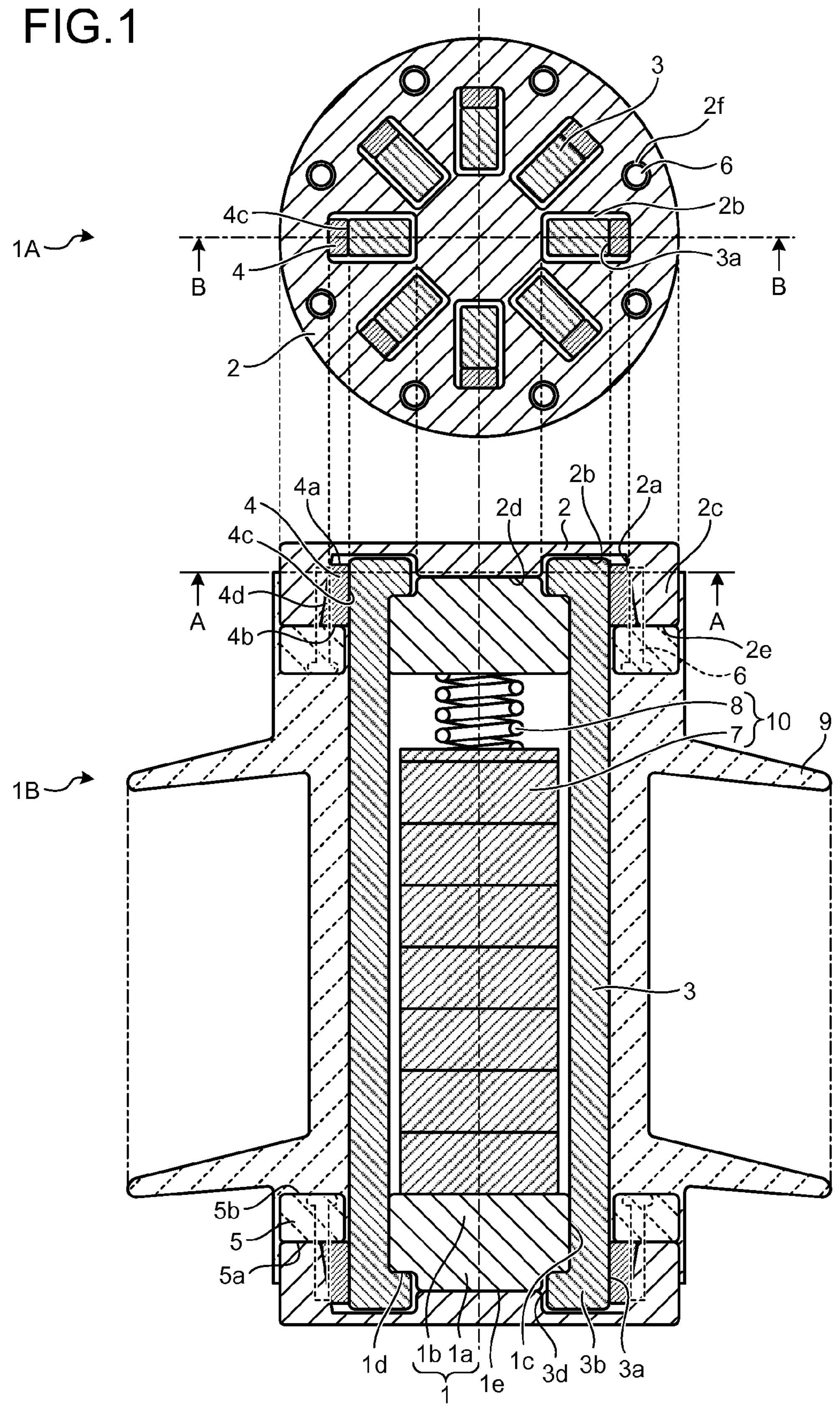
FIG. 1 is a cross-sectional view of an arrester according to a first embodiment of the present invention.
Figure 2:
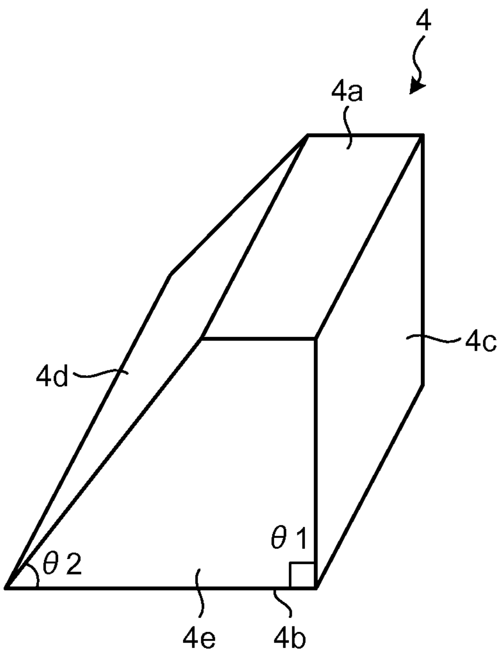
FIG. 2 is a detailed view of a configuration of a wedge-shaped member shown in FIG. 1.

FIG. 1 is a cross-sectional view of an arrester according to a first embodiment of the present invention, where 1A in FIG. 1 depicts a cross-sectional view cut along the line A-A in 1B in FIGS. 1, and 1B in FIG. 1 depicts a cross-sectional view cut along the line B-B in 1A in FIG. 1. FIG. 2 is a detailed view of a configuration of a wedge-shaped member 4 shown in FIG. 1.

A plurality of zinc oxide elements 7, each of which is a voltage nonlinear resistive element, are stacked in a center portion of the arrester shown in FIG. 1. A cross-sectional shape of the zinc oxide element 7 is a circular shape, for example. On a first end of a stack of the zinc oxide elements 7 in a stacking direction, a pressing spring 8 is arranged in a contracted state, thereby biasing the zinc oxide elements 7 in the stacking direction. This brings the zinc oxide elements 7 into tight contact with each other. The zinc oxide elements 7 are fixed by a spring load of the pressing spring 8 so that a position shift of the zinc oxide elements 7 due to an impact at the time of transporting or the like is suppressed. The stacked zinc oxide elements 7 and the pressing spring 8 constitute a serial member 10.

An electrode 1 is arranged on each of both edges of the serial member 10 in the stacking direction. That is, a pair of electrodes 1 is arranged to sandwich the serial member 10 in the stacking direction. For example, the electrode 1 is formed of a disk-shaped metal, and includes a large diameter portion 1*b* arranged on a center portion side of the arrester and having a diameter larger than an outer diameter of the zinc oxide element 7, and a small diameter portion 1*a* arranged on a side of the electrode 2 of the arrester and having a diameter smaller than that of the large diameter portion 1*b*.

A plurality of insulating clamp members 3 extending in the stacking direction are arranged around the serial member 10. Each of the insulating clamp members 3 is formed in a rod shape made of FRP, for example. No mechanically processed portion such as a hole processed portion or a groove portion is formed on the insulating clamp member 3, and an outer circumferential surface of the insulating clamp member 3 is substantially uniform. The insulating clamp members 3 are arranged around the serial member 10, for example, at a regular interval. In the example shown in FIG. 1, eight insulating clamp members 3 are arranged around the serial member 10. A bent portion 3*b* is formed on an edge portion of the insulating clamp member 3 to couple the pair of electrodes 1 for improving the mechanical strength of the arrester. That is, the insulating clamp member 3 is formed such that the edge portion is bent toward an axial line side of the electrode 1 to support an outer edge portion 1*d* of an axial-direction outer edge portion of the large diameter portion 1*b* and an end surface 3*d* is positioned on more axial line side of the electrode 1 than an extended line of an outer circumferential surface 1*c* of the large diameter portion 1*b*.

The electrode 2 formed in a circular disk shape is provided on a side of an axial-direction outer edge portion 1*e* of the electrode 1, which is electrically connected to the small diameter portion 1*a* of the electrode 1. The electrode 2 is formed in a recessed shape having a bottom portion with a surface facing the electrode 1 projected toward a stacking-direction outer side. The same number of recessed portions 2*b* as the number of the insulating clamp members 3 are formed on a bottom portion 2*d*. The recessed portions 2*b* are provided at a substantially regular interval in a circumferential direction at positions respectively facing edge portions of the insulating clamp members 3 with a size appropriate for disposing an edge portion of the insulating clamp member 3 and an edge portion of the wedge-shaped member 4.

An outer circumferential edge 2*c* is provided on an outer circumference side of the electrode 2 to surround a radial-direction outer surface 3*a* of the insulating clamp member 3 (for example, the bent portion 3*b*) and is projected in a direction in which the electrodes 2 face each other. An inner circumferential surface 2*a* of the outer circumferential edge 2*c* is inclined such that an inner diameter is decreased from an axial-direction inner end surface 2*e* of the outer circumferential edge 2*c* toward a base portion (the recessed portion 2*b*) of the outer circumferential edge 2*c*.

An annular member 5 that presses the wedge-shaped member 4 against the side of the bottom portion 2*d* of the electrode 2 is arranged on the axial-direction inner end surface 2*e* of the outer circumferential edge 2*c*. A through hole (not shown) for a fastening member (for example, a bolt 6) passing through in the axial direction is formed on the annular member 5. Furthermore, an insertion hole 2*f* for the bolt 6 is formed on the electrode 2 at a place of the same radial-direction position as the through hole. A female thread is formed in the insertion hole 2*f*, and the bolt 6 is screwed into the female thread portion from the side of the annual member 5. For example, the bolt 6 is inserted from an axial-direction inner end surface 5*b* of the annular member 5, and passes through the annular member 5. A male thread portion that is a leading edge portion of the bolt 6 is screwed into the electrode 2. An axial direction of the bolt 6 is parallel to the stacking direction, and a plurality of bolts 6 are arranged on the electrode 2 in a circumferential direction. In the example shown in FIG. 1, eight bolts 6 are arranged in the circumferential direction in an alternate manner with the insulating clamp member 3. By tightening the bolt 6, the insulating clamp member 3 is pressed and tightened in the radial direction.

An outer coat 9 directly covers the serial member 10, the annular members 5, and the insulating clamp members 3 in an integral manner. The outer coat 9 is made of an insulating resin material such as polymer, for example, silicon rubber. A plurality of corrugations are formed on an outer circumferential surface of the outer coat 9 along the stacking direction. When a short-circuit current flows through the arrester, a high-temperature and high-pressure arc gas is generated in the arrester. An opening is formed on the outer coat 9 by a pressure of the arc gas, and the arc gas is discharged from this opening.

The shape of the wedge-shaped member 4 is described below with reference to FIG. 2. The wedge-shaped member 4 is formed in a wedge shape including an axial-direction outer end surface 4*a* facing the recessed portion 2*b*, an axial-direction inner end surface 4*b* formed facing and in parallel to an axial-direction outer end surface 5*a* of the annular member 5, a radial-direction inner end surface 4*c* formed facing and in parallel to the radial-direction outer surface 3*a*, an axial-direction outer end surface 4*d* facing and in parallel to the inner circumferential surface 2*a*, and a side surface 4*e* formed on the circumferential direction side. The wedge-shaped member 4 formed in a wedge shape tapered from the axial-direction inner end surface 4*b* toward the axial-direction outer end surface 4*a*.

The procedure of assembling the arrester is as follows. First, the zinc oxide elements 7 are stacked, the pressing spring 8 and the electrodes 1 are on the end surfaces of the zinc oxide elements 7, and then the insulating clamp members 3 are fitted in a state where the electrodes 1 are pressed in the axial direction. As shown in 1A in FIG. 1, the wedge-shaped member 4 is inserted into a space between the outer circumferential edge 2*c* and the radial-direction outer surface 3*a* of the bent portion 3*b*. The bolt 6 is inserted from the side of the annular member 5, and by tightening the bolt 6, the annular member 5 is moved to approach the axial-direction inner end surface 2*e* of the electrode 2. At this time, the axial-direction inner end surface 4*b* of the wedge-shaped member 4 is pressed by the axial-direction outer end surface 5*a* of the annular member 5, by which the wedge-shaped member 4 is moved toward the axial-direction outer side. As the inner circumferential surface 2*a* of the electrode 2 is inclined, a pressing force of the wedge-shaped member 4 toward the radial-direction inner side is exerted on the insulating clamp members 3. That is, by tightening the bolt 6, the pressing force exerted on the insulating clamp members 3 is increased.

As described above, the arrester according to the first embodiment includes the stacked voltage nonlinear resistive elements (the zinc oxide elements 7), the serial member 10 including the zinc oxide elements 7 and the pressing spring 8 arranged on one end of the stacked zinc oxide elements 7 and biasing the zinc oxide elements 7 in the stacking direction, a pair of first electrodes (the electrodes 1) arranged on respective ends of the serial member 10 to sandwich the serial member 10 in the stacking direction, a pair of second electrodes (the electrodes 2) each having a circular disk shape and respectively arranged on outer sides of the electrodes 1 in the stacking direction respectively facing the electrodes 1, a plurality of insulating clamp members 3 extending in the stacking direction and arranged around the serial member 10 each including the bent portion 3*b* on each end portion of the insulating clamp member 3, which is bent toward the axial line of the electrodes 1 at a position close to where respective electrode 1 and electrode 2 facing each other, and the wedge-shaped member 4 arranged on the side of the radial-direction outer surface 3*a* of the insulating clamp member 3 and tapered in the stacking direction, the electrode 2 includes the outer circumferential edge 2*c* surrounding the radial-direction outer surface 3*a* of the insulating clamp member 3, the annular member 5 is arranged on the axial-direction inner end surface 2*e* of the outer circumferential edge 2*c* and configured to bias the wedge-shaped member 4, the wedge-shaped member 4 is pressed against the annular member 5 and the electrode 2 by a fastening member (the bolt 6) inserted from the stacking-direction inner end surface (the axial-direction inner end surface 5*b*) of the annular member 5 being screwed into the electrode 2, thereby pressing the radial-direction outer surface 3*a* of the insulating clamp members 3. Therefore, any FRP spiral member according to conventional techniques is not needed, and as a result, no gap is generated between the inner surface of the FRP spiral member and the outer surfaces of the FRP clamp members. Furthermore, in the arrester according to the first embodiment, as the wedge-shaped member 4 biases the outer side of the insulating clamp members 3 by the annular member 5 being fastened with the bolt 6, the electrode 1 and the insulating clamp members 3 are solidly fixed, and the rigidity against the bending load of the arrester is improved as compared to conventional techniques. As a result, an arrester having a large mechanical strength can be obtained without taking any measures such as increasing the number of insulating clamp members 3 or increasing the cross-sectional area of the insulating clamp members 3, and at the same time, the cost can be reduced because the structure can be simplified as compared to the conventional arrester. In addition, because the FRP spiral member is not needed, the silicon rubber in the axial direction of the arrester can be made thinner, which enables both an improvement of the pressure discharge performance and a reduction of the cost by downsizing.

Furthermore, in the arrester according to the first embodiment, the inner circumferential surface 2*a* of the outer circumferential edge 2*c* is projected in a direction in which the electrodes 2 face each other and inclined such that the inner diameter of the outer circumferential edge 2*c* is decreased from the axial-direction inner end surface 2*e* toward the base portion (the recessed portion 2*b*) of the outer circumferential edge 2*c*, the wedge-shaped member 4 is formed in a wedge shape tapered from the stacking-direction outer end surface (the axial-direction outer end surface 5*a*) of the annular member 5 toward the electrode 2 and includes the stacking-direction inner end surface (the axial-direction inner end surface 4*b*) that is pressed by the axial-direction outer end surface 5*a* of the annular member 5, the stacking-direction outer end surface (the axial-direction outer end surface 4*d*) formed facing and in parallel to the inner circumferential surface 2*a*, and the radial-direction inner end surface 4*c* that presses the radial-direction outer surface 3*a* of the insulating clamp member 3. Therefore, the electrode 1 and the insulating clamp member 3 can be solidly fixed by the wedge-shaped member 4 having a simplified structure.

Second Embodiment

Figure 3:
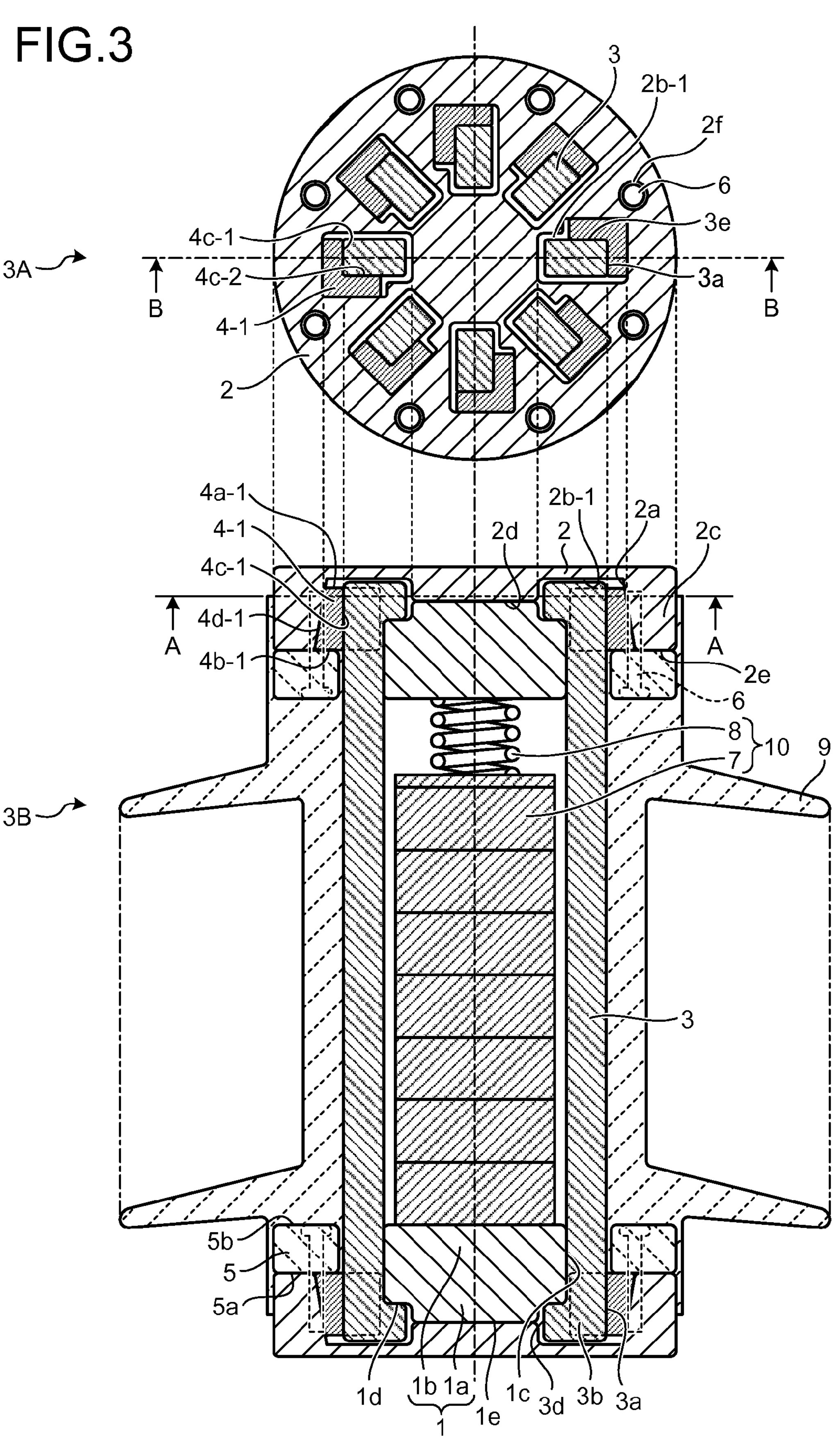
FIG. 3 is a cross-sectional view of an arrester according to a second embodiment of the present invention.
Figure 4:
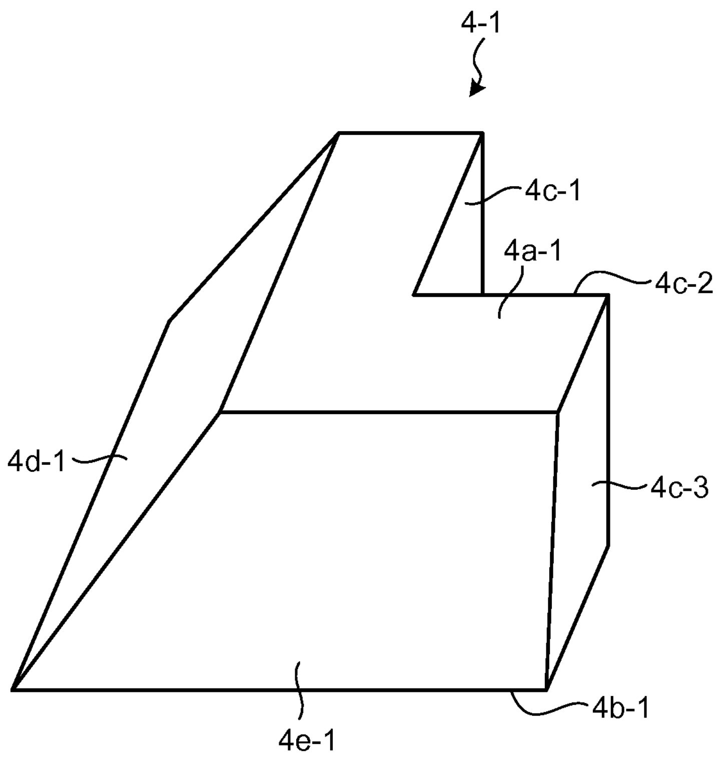
FIG. 4 is a detailed view of a configuration of a wedge-shaped member shown in FIG. 3.

FIG. 3 is a cross-sectional view of an arrester according to a second embodiment of the present invention, where 3A in FIG. 3 depicts a cross-sectional view cut along the line A-A in 3B in FIGS. 3, and 3B in FIG. 3 depicts a cross-sectional view cut along the line B-B in 3A in FIG. 3. FIG. 4 is a detailed view of a configuration of a wedge-shaped member 4-1 shown in FIG. 3. Elements identical to those described in the first embodiment are denoted by like reference signs and only elements different from the first embodiment are described below.

As shown in FIG. 3, the same number of recessed portions 2*b*-1 as the number of the insulating clamp members 3 are formed on the bottom portion 2*d*. The recessed portions 2*b*-1 are provided at a substantially regular interval in a circumferential direction at positions respectively facing edge portions of the insulating clamp members 3. The recessed portions 2*b*-1 are formed with a size appropriate for disposing an edge portion of the insulating clamp member 3 and an edge portion of the wedge-shaped member 4-1.

As shown in FIG. 4, the wedge-shaped member 4-1 is formed in a wedge shape tapered from an axial-direction inner end surface 4*b*-1 toward an axial-direction outer end surface 4*a*-1 and its cross section in a direction perpendicular to the stacking direction is formed in an L shape. Specifically, the wedge-shaped member 4-1 includes the axial-direction outer end surface 4*a*-1 facing the recessed portion 2*b*-1, the axial-direction inner end surface 4*b*-1 formed facing and in parallel to the axial-direction outer end surface 5*a*, an radial-direction inner end surface 4*c*-1 formed facing and in parallel to the radial-direction outer surface 3*a*, a circumferential-direction outer surface 4*c*-2 formed facing and in parallel to a circumferential-direction outer surface 3*e* (see 3A in FIG. 3), an radial-direction inner end surface 4*c*-3 formed on an axial line side of the electrode 1, an axial-direction outer end surface 4*d*-1 formed facing and in parallel to an inner circumferential surface 2*a*, and a side surface 4*e*-1 formed on a circumferential direction side.

In the arrester according to the second embodiment, the annular member 5 is moved to approach the axial-direction inner end surface 2*e* of the electrode 2 by the bolt 6 being tightened. At this time, the axial-direction inner end surface 4*b*-1 of the wedge-shaped member 4-1 is pressed by the axial-direction outer end surface 5*a* of the annular member 5 so that the wedge-shaped member 4-1 is moved toward the axial-direction outer side. At this time, as the inner circumferential surface 2*a* of the electrode 2 is inclined, a pressing force of the wedge-shaped member 4-1 toward the radial-direction inner side is exerted on the insulating clamp member 3. Therefore, the circumferential-direction outer surface 3*e* and the radial-direction outer surface 3*a* of the insulating clamp member 3 are pressed by the radial-direction inner end surface 4*c*-1 and the circumferential-direction outer surface 4*c*-2 of the wedge-shaped member 4-1, by which the electrode 1 and the insulating clamp member 3 are solidly fixed.

As described above, in the arrester according to the second embodiment, the inner circumferential surface 2*a* of the outer circumferential edge 2*c* is projected in a direction in which the electrodes 2 face each other and inclined such that the inner diameter of the outer circumferential edge 2*c* is decreased from the axial-direction inner end surface 2*e* toward the recessed portion 2*b*-1 of the outer circumferential edge 2*c*, the wedge-shaped member 4-1 is formed in a wedge shape tapered from the axial-direction outer end surface 5*a* of the annular member 5 toward the electrode 2 with a cross section in the direction perpendicular to the stacking direction formed in an L shape and includes the stacking-direction inner end surface (the axial-direction inner end surface 4*b*-1) that is pressed by the axial-direction outer end surface 5*a* of the annular member 5, the stacking-direction outer end surface (the axial-direction outer end surface 4*d*-1) formed facing and in parallel to the inner circumferential surface 2*a*, the axial-direction inner end surface 4*c*-1 that presses the radial-direction outer surface 3*a* of the insulating clamp member 3, and the circumferential-direction outer surface 4*c*-2 formed facing and in parallel to the circumferential-direction outer surface 3*e* of the insulating clamp member 3. Therefore, as compared to the first embodiment, a contact area of the outer circumferential edge 2*c* and the wedge-shaped member 4-1 is increased so that the electrode 1 and the insulating clamp member 3 can be solidly fixed.

Third Embodiment

Figure 5:
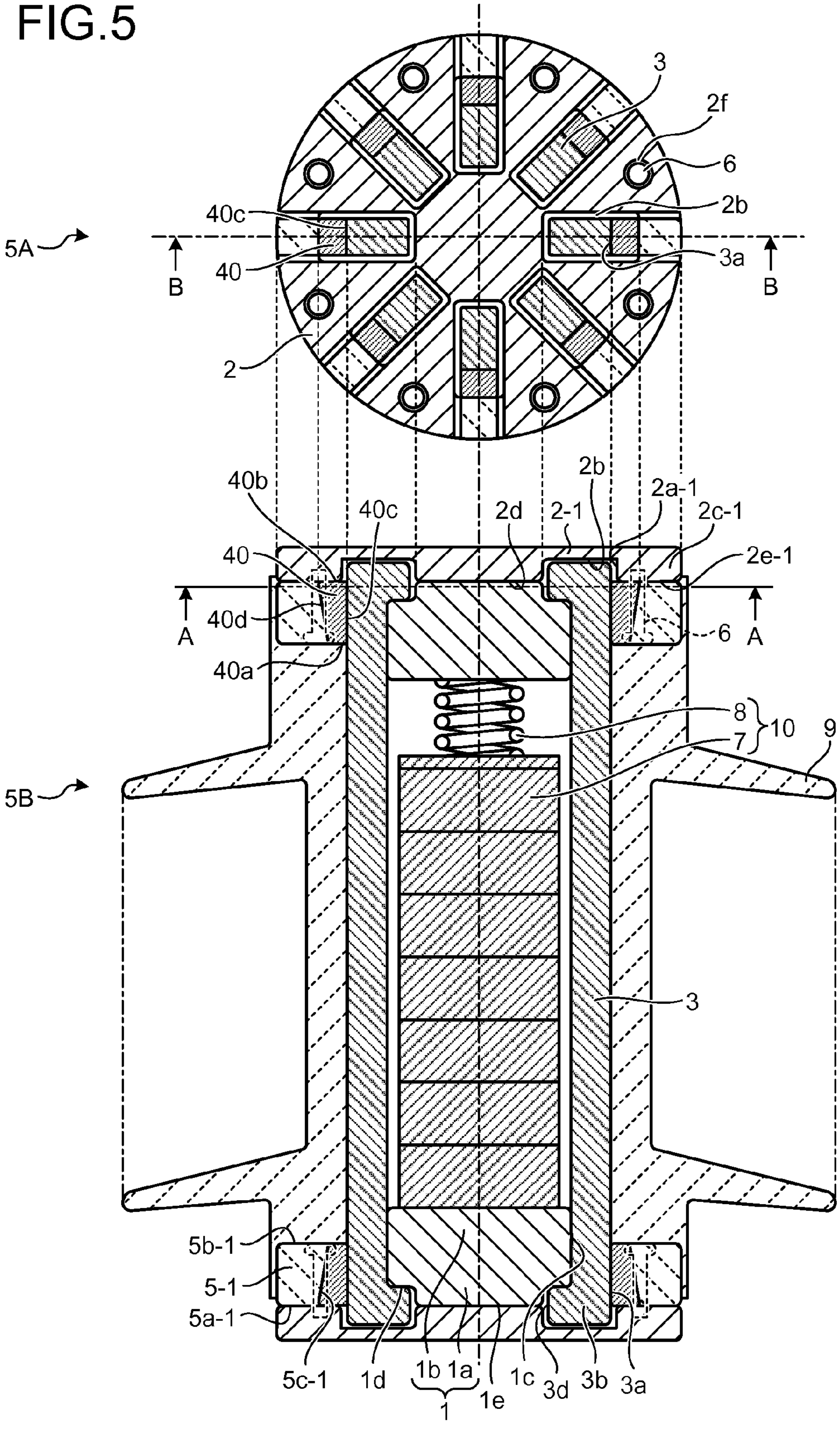
FIG. 5 is a cross-sectional view of an arrester according to a third embodiment of the present invention.

FIG. 5 is a cross-sectional view of an arrester according to a third embodiment of the present invention, where 5A in FIG. 5 depicts a cross-sectional view cut along the line A-A in 5B in FIGS. 5, and 5B in FIG. 5 depicts a cross-sectional view cut along the line B-B in 5A in FIG. 5. Elements identical to those described in the first embodiment are denoted by like reference signs and only elements different from the first embodiment are described below.

An outer circumferential edge 2*c*-1 is provided on an outer circumferential side of the electrode 2 to surround the radial-direction outer surface 3*a* of the bent portion 3*b*. Unlike the first and second embodiments, the inner circumferential surface 2*a*-1 of the outer circumferential edge 2*c*-1 is formed in parallel to the axial line of the arrester. An annular member 5-1 is arranged on an axial-direction inner end surface 2*e*-1 of the outer circumferential edge 2*c*-1 to press a wedge-shaped member 40. The annular member 5-1 is formed to include an axial-direction outer end surface 5*a*-1 facing the axial-direction inner end surface 2*e*-1 of the outer circumferential edge 2*c*-1, and an axial-direction inner end surface 5*b*-1 opposite to the axial-direction outer end surface 5*a*-1, and an radial-direction inner end surface 5*c*-1 inclined such that an inner diameter is decreased from the axial-direction outer end surface 5*a*-1 toward the axial-direction inner end surface 5*b*-1. In the same manner as the annular member 5 of the first embodiment, a through hole (not shown) for a fastening member (for example, the bolt 6) passing through in the axial direction is formed on the annular member 5-1. For example, the bolt 6 is inserted from the axial-direction inner end surface 5*b*-1 of the annular member 5-1, and passes through the annular member 5-1. A male thread portion that is a leading edge portion of the bolt 6 is screwed into the electrode 2.

The wedge-shaped member 40 is formed in a wedge shape tapered from an axial-direction outer end surface 40*b* toward an axial-direction inner end surface 40*a*. Specifically, the wedge-shaped member 40 includes the axial-direction outer end surface 40*b* formed facing and in parallel to the axial-direction inner end surface 2*e*-1, an radial-direction inner end surface 40*c* formed facing and in parallel to the radial-direction outer surface 3*a*, and an radial-direction outer end surface 40*d* formed facing and in parallel to the radial-direction inner end surface 5*c*-1.

In the arrester according to the third embodiment, the annular member 5-1 is moved to approach the axial-direction inner end surface 2*e*-1 of the electrode 2 by the bolt 6 being tightened. At this time, the radial-direction outer end surface 40*d* is pressed by the radial-direction inner end surface 5*c*-1 so that the wedge-shaped member 40 is moved toward the axial-direction outer side. At this time, as the radial-direction outer end surface 40*d* is inclined, a pressing force of the wedge-shaped member 40 toward the radial-direction inner side is exerted on the insulating clamp member 3. That is, by tightening the bolt 6, the pressing force exerted on the insulating clamp members 3 is increased.

As described above, in the arrester according to the third embodiment, the annular member 5-1 includes the axial-direction outer end surface 5*a*-1 facing the stacking-direction inner end surface (the axial-direction inner end surface 2*e*-1) of the outer circumferential edge 2*c*-1, the axial-direction inner end surface 5*b*-1, and the radial-direction inner end surface 5*c*-1 that is inclined such that the inner diameter is decreased from the axial-direction outer end surface 5*a*-1 toward the axial-direction inner end surface 5*b*-1, and the wedge-shaped member 40 includes the radial-direction inner end surface 40*c* that presses the radial-direction outer surface 3*a* of the insulating clamp member 3, the axial-direction outer end surface 40*b* that is pressed by the axial-direction inner end surface 2*e*-1 of the outer circumferential edge 2*c*-1, and the radial-direction outer end surface 40*d* formed facing and in parallel to the radial-direction inner end surface 5*c*-1 of the annular member 5-1. The wedge-shaped member 40 is formed in a wedge shape tapered from the axial-direction outer end surface 40*b* toward the axial-direction inner end surface 40*a*. Therefore, identical effects as those of the first embodiment can be obtained. Furthermore, because the length of the outer circumferential edge 2*c*-1 in the axial direction can be shortened as compared to the first and second embodiments, the volume of the electrode 2 can be reduced, and as a result, the cost can be further reduced. In addition, in the arrester according to the third embodiment, because the wedge-shaped member 40 abuts the radial-direction outer surface 3*a* of the bent portion 3*b*, the end surface 3*d* is securely pressed to the axial center side of the arrester, and as compared to the first and second embodiments, an engaged state of the outer edge portion 1*d* of the electrode 1 and the bent portion 3*b* can be hardly disengaged. Further, in the arrester according to the third embodiment, as compared to the first and second embodiments, as the length of the outer circumferential edge 2*c*-1 in the axial direction can be shortened, for example, it can be processed to the same thickness as the bottom portion 2*d* of the electrode 2, enabling omission of unnecessary processes for forming the recessed portion on the bottom portion 2*d*.

The arrester according to the above embodiments is only an example of the contents of the present invention, and the arrester can be combined with other publicly known techniques. It goes without saying that the present invention can be achieved by a modified configuration without departing from the scope of the invention, such as omitting a part of constituent elements described above.

According to the present invention, because a wedge-shaped member, which is pressed by an annular member by tightening the annular member with a fastening member, biases an outer side of an insulating clamp member made of FRP, which eliminates the necessity of taking measures such as an increase of the number of insulating clamp members or an increase of a cross-sectional area of the insulating clamp member, an arrester having a large mechanical strength can be obtained without causing any size increase.

What is claimed is:

1. An arrester comprising:

a serial member including voltage nonlinear resistive elements and a pressing spring, the voltage nonlinear resistive elements being stacked, the pressing spring being arranged on one end of the stacked voltage nonlinear resistive elements, the pressing spring biasing the voltage nonlinear resistive elements in a stacking direction thereof;

a pair of first electrodes arranged on both ends of the serial member to sandwich the serial member in the stacking direction;

a pair of second electrodes each having a circular disk shape and respectively arranged on outer sides of the first electrodes in the stacking direction respectively facing the first electrodes;

a plurality of insulating clamp members extending in the stacking direction and arranged around the serial member, each of the insulating clamp members including a bent portion on each end portion of the insulating clamp member, the bent portion being bent toward an axial line of the first electrodes at a position close to where the first electrode and second electrode facing each other;

a wedge-shaped member arranged on a radial-direction outer surface side of each of the insulating clamp members and tapered in the stacking direction, wherein each of the second electrodes includes an outer circumferential edge surrounding an outer surface of each of the insulating clamp members, the arrester further comprises:

an annular member that is arranged on a stacking-direction inner end surface of the outer circumferential edge and is configured to bias the wedge-shaped member; and a fastening member that is inserted from a stacking-direction inner end surface of the annular member and is configured to fasten the annular member and the second electrode, and wherein the wedge-shaped member is pressed against the second electrode by the annular member, thereby pressing the radial-direction outer surface of the insulating clamp member.

2. The arrester according to claim 1, wherein an inner circumferential surface of the outer circumferential edge is projected in a direction in which the second electrodes face each other and inclined such that an inner diameter of the outer circumferential edge is decreased from the stacking-direction inner end surface toward a base portion of the outer circumferential edge, the wedge-shaped member is formed in a wedge shape tapered from a stacking-direction outer end surface of the annular member toward the second electrode, and the wedge-shaped member includes:

a stacking-direction inner end surface that is pressed by the stacking-direction outer end surface of the annular member;

a stacking-direction outer end surface formed facing and in parallel to the inner circumferential surface; and a radial-direction inner end surface that presses the radial-direction outer surface of the insulating clamp member.

3. The arrester according to claim 1, wherein an inner circumferential surface of the outer circumferential edge is projected in a direction in which the second electrodes face each other and inclined such that an inner diameter of the outer circumferential edge is decreased from the stacking-direction inner end surface toward a base portion of the outer circumferential edge, the wedge-shaped member is formed in a wedge shape tapered from an stacking-direction outer end surface of the annular member toward the second electrode with a cross section in a direction perpendicular to the stacking direction formed in an L shape, and the wedge-shaped member includes:

a stacking-direction inner end surface that is pressed by the stacking-direction outer end surface of the annular member;

a stacking-direction outer end surface formed facing and in parallel to the inner circumferential surface;

a radial-direction inner end surface that presses the radial-direction outer surface of the insulating clamp member; and a circumferential-direction side surface formed facing and in parallel to a circumferential-direction side surface of the insulating clamp member.

4. The arrester according to claim 1, wherein the annular member includes:

an axial-direction outer end surface facing a stacking-direction inner end surface of the outer circumferential edge;

an axial-direction inner end surface opposite to the axial-direction outer end surface; and a radial-direction inner end surface inclined such that an internal diameter is decreased from the axial-direction outer end surface toward the axial-direction inner end surface, the wedge-shaped member includes:

a radial-direction inner end surface that presses the radial-direction outer surface of the insulating clamp member;

an stacking-direction outer end surface that is pressed by the stacking-direction inner end surface of the outer circumferential edge;

a radial-direction outer end surface formed facing and in parallel to the radial-direction inner end surface of the annular member; and a stacking-direction inner end surface opposite to the stacking-direction outer end surface, and wherein the wedge-shaped member is formed in a wedge shape tapered from the stacking-direction outer end surface of the wedge-shaped member toward the stacking-direction inner end surface of the wedge-shaped member.

* * * * *